United States Patent [19]

Radliff

[11] Patent Number: 4,848,621
[45] Date of Patent: Jul. 18, 1989

[54] FUEL CAP WITH COMPARTMENT

[76] Inventor: D. Jon Radliff, 1741 Geary Rd., Walnut Creek, Calif. 94596

[21] Appl. No.: 240,636

[22] Filed: Sep. 6, 1988

[51] Int. Cl.[4] .............................................. B65D 1/24
[52] U.S. Cl. ................................ 220/23; 220/DIG. 33
[58] Field of Search .............. 220/23, DIG. 33; 215/6

[56] References Cited

U.S. PATENT DOCUMENTS

| | | | |
|---|---|---|---|
| 2,981,435 | 4/1961 | McCarthy | 220/23 |
| 4,299,102 | 11/1981 | Aro | 220/DIG. 33 X |
| 4,720,351 | 1/1988 | Flynn et al. | 220/23 X |

*Primary Examiner*—Stephen Marcus
*Assistant Examiner*—Nova Stucker

[57] ABSTRACT

A new type of cap for fuel containers possessing a concealed compartment for storage of keys which is far safer to use than prior art fuel caps comprising a cap prepared from tough plastic material, such as ABS polymeric material, a closure for engaging the cap to the container, a gasket for effecting a tight seal between the cap and the container, a lock for locking the cap in place on the container, such as by a combination locking device, and a plastic enclosed compartment of sufficient size to hold a key with removable lid attached to the bottom inside of the cap.

8 Claims, 4 Drawing Sheets

FUEL CAP WITH COMPARTMENT

BACKGROUND OF THE INVENTION

1. Field of the Invention

This invention relates to a cap for fuel tanks. More particularly, the invention relates to a new type of fuel cap possessing a separate compartment for storage of keys, etc.

Specifically, the invention provides a new type of cap for fuel containers possessing a concealed compartment for storage of keys which is far safer to use than similar caps of the prior art. The new fuel caps of the present invention broadly comprises a cap prepared from tough plastic material, closure means for engaging the cap to the container with gasket means for effecting a tight seal of said cap to the container, locking means for locking the cap in place on the container, plastic enclosed compartment of sufficient size to hold a key with removable lid attached to the bottom inside of the said cap, preferably with vent means contained within said cap to vent excess gas pressure building up within the container.

2. Prior Art

Many vehicle operators sometimes become forgetful and lock their keys in the vehicle. In order to unlock the vehicle they many times have to break the window or use a wire hook to go through the insulation around the window and the pull up on the door handle. This is quite embarrassing and takes considerable time and effort, and means have been sought to solve this problem.

It has been proposed in the past to have an extra key for the vehicle attached by magnet means to the underside of the car or under the hood so that it would be available if the other keys were locked inside the vehicle. This has helped in some cases, but in many cases the keys have been dislodged from its location, particularly when the vehicle has travelled over a rough terrain for some time and the keys are not there when needed.

It is an object of the invention, therefore, to provide a solution to the above-noted problem. It is a further object to provide a new type of fuel cap containing a sealed compartment for key storage. It is a further object to provide a new type of safe fuel cap which can be locked with combination lock means and quickly removed to provide an extra key for the vehicle. These and other objects of the invention will be apparent from the following detailed description thereof.

SUMMARY OF THE INVENTION

It has now been discovered that these and other objects, can be accomplished by the new fuel caps with compartments of the present invention which provides for the first time a safe and efficient device for the storage of vehicle keys for use in replacing lost keys or keys enclosed within the vehicle.

The new fuel caps of the present invention broadly comprise in combination a cap prepared from tough plastic material, closure means for engaging the cap to the top of the container with gasket means for effecting a tight seal of said cap to the container, locking means for locking the cap in place on the container, plastic enclosed compartment of sufficient size to holed a key with removable lid attached to the bottom inside of the said cap, preferably with vent means contained within said cap to vent excess gas pressure building up within the container.

It has been found that the above-noted device provides a safe and efficient way for storage of an extra vehicle key in the event it is need to unlock and start the said vehicle. In operation, the fuel cap is removed from the top of the container, the lid on the concealed compartment threadedly removed and the extra key placed within the compartment and lid threaded back onto the compartment, and the cap returned to the container and lock thereon, preferably with combination lock means. In the event the extra key is needed to open the vehicle door, the cap is unlocked, and preferably by use of the combination lock, and the extra key removed from the compartment and used to unlock the vehicle. The key can then be returned to the compartment attached to the fuel cap for possible future use. In the event the locking means is a combination lock and there is a possibility of forgetting the combination, the numbers could be attached in an unobvious place on the inside of the vehicle window so that it could be easily seen through the window and used to remove the cap from the container and retrieve the needed key.

DESCRIPTION OF THE DRAWINGS

The various objects and features of the present invention will be more fully understood by reference to the accompanying drawings.

DETAILED DESCRIPTION OF THE DRAWINGS

Figure 1:
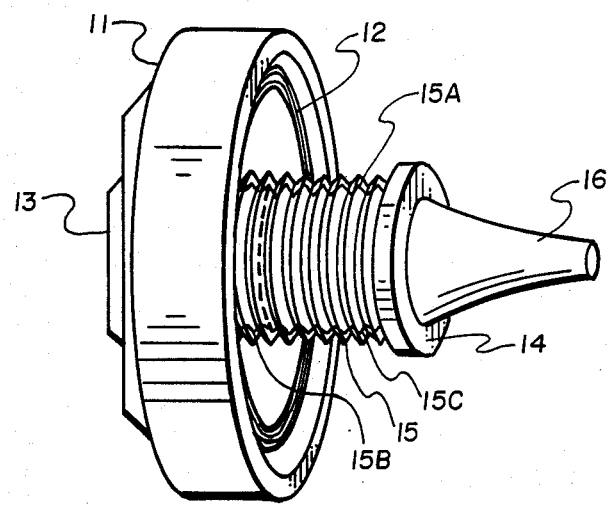
FIG. 1 is a perspective view taken from the left side of the assembled fuel cap device.

With reference to FIG. 1, the plastic cap cover is shown as 11, the open ended threaded cylinder is shown as 15, which cylinder is attached to the inside bottom of the cap cover and has threaded male means 15A on the outside of the cylinder for joining the cap to the fuel container, and threaded female means 15B for receiving the threaded male means connector 15C of the storage assembly 16. The rigid handle to assist in threading the male connector 15C into the cylinder is shown as 14. Gasket means attached to the inside bottom of the cap cover to help seal the cap against the fuel container is shown as 12. The locking means is shown at the top of the cap cover as 13.

Figure 2:
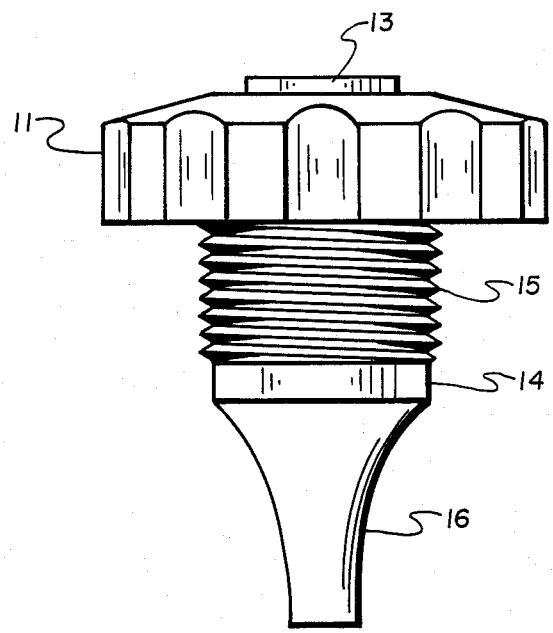
FIG. 2 is a front view of the assembled fuel cap.

With reference to FIG. 2 which is a front view of the cap assembly, the cap cover is shown as 11, the open ended threaded cylinder as 15, the ridged handle to assist the threading of the storage compartment 16 into the inside of the cylinder is shown as 14. The locking means cover at the top of the cap is shown as 13.

Figure 3:
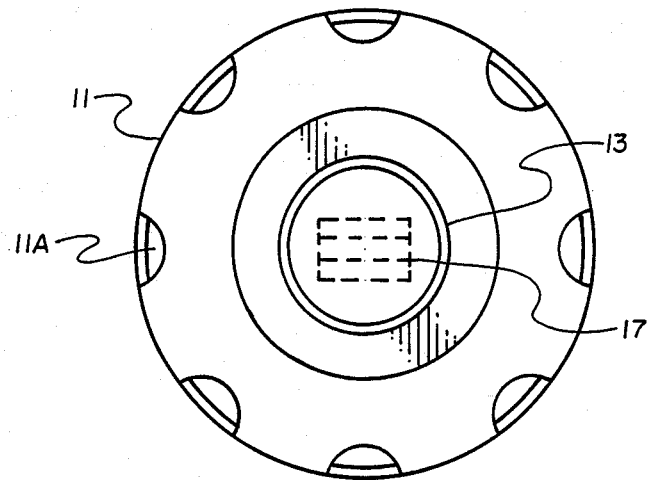
FIG. 3 is a top view of the fuel cap.

FIG. 3 is a top view of the cap cover showing the cover 11, the concave indentations on the side of the cap to assist one in twisting the cap as 11A, the cover for the locking means as 13 and the combination locking means shown by dotted lines as 17.

Figure 4:
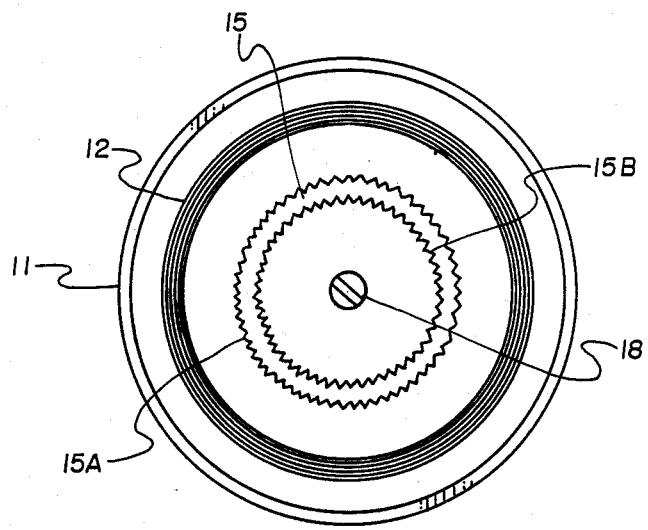
FIG. 4 is a bottom view showing the inside assembly of the fuel cap without the compartment.

FIG. 4 is a bottom view of the inside of the cap assembly. The cap cover is shown as 11, the gasket as 12, the open ended cylinder 15 with threaded means 15A on the outside of the cylinder to assisting in joining the cap to the fuel container, the threaded means inside the cylinder to receive the male connector of the storage compartment is shown as 15B. The bolt means attaching the cylinder to the bottom of the cap is shown as 18.

Figure 5:
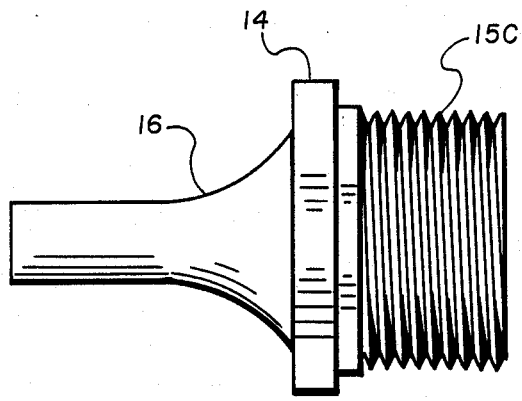
FIG. 5 is a side view of the compartment assembly that is attached to the fuel cap.

FIG. 5 is a side view of the storage compartment assembly. The assembly is shown as 16, the rigid handle to assist in threading the compartment container into the cylinder is shown as 14, and the male thread connector at the end of the compartment assembly to be engaged with the cylinder is shown as 15C.

Figure 6:
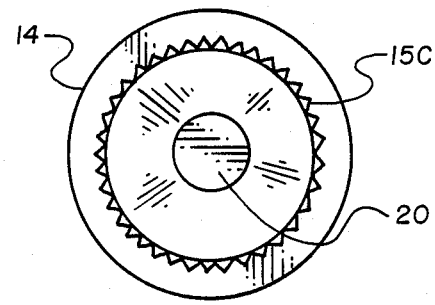
FIG. 6 is an inside view of the compartment showing the space where the key can be retained.

FIG. 6 is an inside top view looking down into the open storage compartment. The ridge handle is shown as 14, the threaded male connector extension of the compartment is shown as 15C and the open interior of the compartment is shown as 20.

Figure 7:
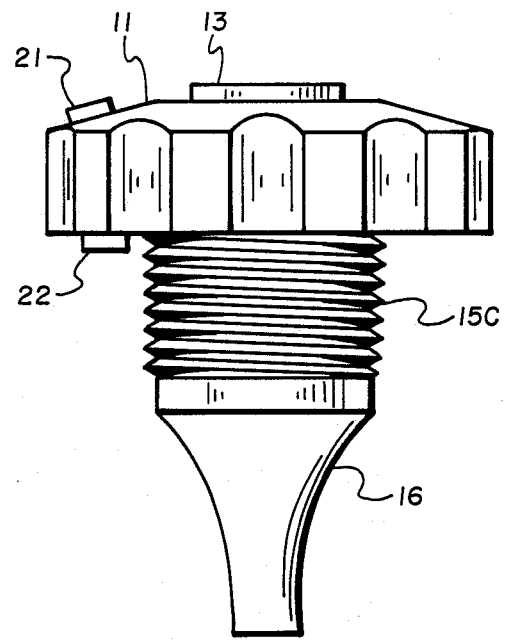
FIG. 7 is a front view of a special embodiment of the assembled fuel cap showing the presence of vent means in the top of the cap.

FIG. 7 is a front view of a special embodiment of the invention wherein the fuel cap contains a vent means at the top of the cap. The cap cover is shown as 11, the cover for the combination lock as 13, the top of the spring release valve is shown as 21, and the bottom of the valve is shown as 22. The storage compartment container is shown as 16 and the male threaded container portion of the compartment as 15C.

Figure 8:
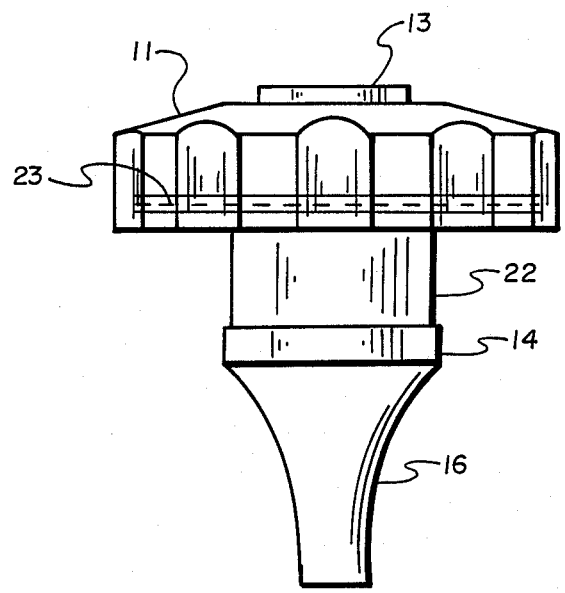
FIG. 8 is a front view of another assembly showing a different way of engaging the fuel container.

FIG. 8 is a front view of another assembly wherein the cap is engaged with the fuel container by thread means in the inside of the cap itself. The cap is shown as 11, the locking means 13, the threads inside the cover as 23, the cylinder threaded inside to receive the storage compartment as 22, the handle for the compartment as 14 and the storage compartment itself as 16.

DETAILED DESCRIPTION OF THE INVENTION

While the above-described description of the invention and the drawings have been made in rather specific terms, it should be understood that various changes can be made in construction and operation without departing from the scope of the present invention.

The cap cover is prepared from a tough plastic material to avoid accidents that sometimes unexpectedly occur through the use of complete metal cap covers. The plastic can be of any suitable type as long as it possesses the above-noted properties and has good resistance to fuels such as may be contained in the fuel container. The plastics also preferably have good heat resistance and resistance to temperatures preferably up to about 250° F. Examples of such materials include the ABS polymers (e.g. acrylonitrile-butadiene- styrene copolymers), polyvinyl acetals, vinyl chloride polymers and copolymers, polycarbonates, cross-linked ethylene or propylene polymers, epoxy resins, and the like, and mixtures thereof.

Particularly preferred are the tough, rubber like polymers represented by the acrylonitrile- butadiene - styrene copolymers, and the polycarbonate type products. Coming under special consideration are those polymers which can be chrome plated or otherwise treated so that the cap cover may appear metallic without all the dangers involved in the use of metal covers themselves.

The cap cover can be of any suitable shape. The cap is preferably circular as shown in the drawings, but it can also be square or have a many sided shape as needed or desired. The sides of the cap cover preferably have some type of indentation or grasping means to facilitate threading the cap onto the top of the fuel container.

The cap cover is preferably an inverted dish shape so that the side of the cover can fit down over the top of the fuel container.

As noted above, the cap cover is equipped with attachment means for securing the cap on the top of the fuel container. In some cases this can be accomplished by threaded means along the inner sides of the inverted dish shaped cover which can then engage with threaded means on the top of the fuel container. In other cases, a threaded cylinder or other shaped projection can be attached to the bottom of the cover so that it extends down and becomes a male threaded connector to engage a threaded female connector of the fuel container. Other types of attachment means can be employed, such as those of the conventional radiator type press down devices which engage off set ledge on the top of the fuel container.

Locking means are preferably located in the top of the cap cover to permit locking of the cap on the top of the fuel container. Preferably the locking means are of the combination locking type employing the conventional tumbler type mechanism so that the mechanism can be set at a certain series of numbers and the cap released when the numbers have been arranged in the correct sequence. This type of locking means is preferred because the numbers can be located in a corner of a window or other visible unobvious place so that the driver can refresh his memory in the event the number of series is forgotten, or the combination can be placed in his wallet.

As noted gasket means are employed within the insides of the inverted U shaped cover so as to provide a vapor seal between the cap and the top of the fuel container. The gasket means can be of any suitable material, such as rubber, and the like, and of any shape or size as needed.

The storage container can be attached to the underside of the can cover by any suitable means. As shown in the drawings, an open ended cylinder can be attached to the bottom of the cap cover and the storage container removably attached thereto. The cylinder can be one that is threaded on the outside and can be threadedly engaged with the female threaded portion of the top of the fuel container to secure the cap cover onto the top of the fuel container. In this case, the inside surface of the said cylinder should be threaded to engage with the male threaded connect at the top of the storage container. It is less preferred to have other means for attaching the cap cover to the fuel container and then having the cylinder attached to the bottom of the cap cover with only the threaded insides to engage the male threaded connector of the storage container.

The storage container itself can be of any suitable size as long as it provides sufficient space for storage of one or more keys needed for the operation of the vehicle. As vehicle keys generally are less than 3 inches in length, the container should generally be not longer then the three inches to avoid undue protrusion into the top of the fuel container. As only a few keys are generally required, the inside diameter of the bottom of the container should preferably be only between $\frac{1}{2}$ and $\frac{3}{4}$ inches.

The preferred storage container is one that provides a compartment which is of cone shape with a length of about 3 inches, a diameter at the top of about $1\frac{1}{2}$ inches and a diameter at the bottom of about $\frac{1}{2}$ inch, with threaded means at the top to threadedly engage the said compartment with the cylinder attached to the underside of the cap cover.

In the preferred embodiment, a vent is placed in the top of the cap cover to release vapor build up in the fuel container in the event the pressure reaches an excessive amount. Such a vent assembly is shown in FIG. 7.

The new fuel caps of the present invention can be used for a variety of different types of fuel containers, but is especially directed to be used for the gasoline fuel tanks of the conventional automobile or truck or recreational vehicle.

As noted above, it is important that the cap cover be prepared from the above-noted plastic material. The other parts of the assembly, such as the cylinder and the storage compartment are also preferably prepared from the same or different type of plastic material. This not only effects a cost saving in construction but also provides a great improvement in safety factor.

PREFERRED EMBODIMENT OF THE INVENTION

A preferred embodiment of the invention is described below. It should be understood, however, that this is given as a preferred assembly only and is not to be regarded as limiting the invention in any way.

A fuel cap was prepared as follows. A cap cover was prepared by injection molding using an ABS copolymer (acrylonitrile-butadiene-styrene copolymer) as the plastic material. The cap was an inverted circular dish shaped with diameter of about 2.45 inches and height of about 1.18 inches. The sides of the cap cover possessed the indentations as shown in the drawings. The thickness of the side of the cap as about ⅛ inches. The cap cover so prepared was then chrome plated to make it look like a metal cap cover, but without the dangers possessed thereby.

A square section of about 1 inch by 0.687 inches was removed from the center top of the cap cover for the insertion of a conventional combination lock device.

An open ended cylinder prepared from polyvinyl acetal was attached to the bottom inside of the cap cover. The cylinder had a diameter of 1.56 inches and a length of about 1.09 inches. The outside surface of the cylinder was threaded so that it would engage the female threaded section of the fuel container top, and the inside surface of the cylinder was threaded to engage the male connector portion of the storage container.

A storage container was prepared from polyvinyl acetal in the shape of a cone as shown in FIG. 1. The top of the container of about 0.96 inches was a cylinder threaded to engage the inside of the above-noted cylinder. The bottom portion of the cone shaped container was about 1.1 inches in length and had a bottom inside diameter of about 0.38 inches.

The completed assembly then comprises the cap cover with combination locking means, a threaded cylinder attached to the bottom inside of the cap, and a storage container threadedly engaged to the inside of the said cylinder.

The above assembly was used as a cap for a gasoline tank of a conventional automobile and proved to have all of the special advantages noted above.

I claim as my invention:

1. A new type of fuel cap with storage compartment comprising in combination a cap cover prepared from a tough plastic material and having an inverted dish shape, closure means for engaging the cap to the desired fuel container, gasket means for effecting a tight seal of said cap to the top of said fuel container, locking means for locking the cap in place on the container, plastic enclosed storage compartment of sufficient size to hold a key with removable lid attached to the bottom inside of the said cap.

2. A fuel cap as defined in claim 1 wherein the locking means is a conventional combination lock means.

3. A fuel cap as defined in claim 1 wherein a vent valve is inserted in the top of the cap cover to effect a release of vapor pressure if the vapor within the fuel container becomes excessive.

4. A fuel cap as defined in claim 1 wherein the closure means for securing the cap on the fuel container comprises male threaded means on a cylinder attached to the bottom of the cap cover adapted to threadedly engage the female threaded means within the top of the fuel container.

5. A fuel cap as defined in claim 1 wherein the storage compartment is sufficient to hold at least 2 vehicle keys.

6. A fuel cap as defined in claim 1 wherein the storage compartment is threadedly engaged within the inside of a cylinder attached to the bottom of the cap cover.

7. A fuel cap as defined in claim 1 wherein the cap cover was prepared from an acrylonitrile-butadiene-styrene polymer and the cylinder attached to the bottom of the cap cover as well as the storage compartment are prepared from polyvinyl acetal polymer.

8. A fuel cap as defined in claim 1 wherein the cap cover prepared from tough plastic material has been chrome plated.

* * * * *